US010926965B2

(12) United States Patent
Kelly

(10) Patent No.: US 10,926,965 B2
(45) Date of Patent: Feb. 23, 2021

(54) SYSTEM AND METHOD USING TELEMETRY TO CHARACTERIZE, MAINTAIN AND ANALYZE PNEUMATIC CONVEYING SYSTEMS

(71) Applicant: IPEG, Inc., Cranberry Township, PA (US)

(72) Inventor: Raymond Kelly, Cranberry Township, PA (US)

(73) Assignee: IPEG, Inc., Cranberry Township, PA (US)

( * ) Notice: Subject to any disclaimer, the term of this patent is extended or adjusted under 35 U.S.C. 154(b) by 0 days.

(21) Appl. No.: 16/368,316

(22) Filed: Mar. 28, 2019

(65) Prior Publication Data

US 2019/0322472 A1 Oct. 24, 2019

Related U.S. Application Data

(60) Provisional application No. 62/649,400, filed on Mar. 28, 2018.

(51) Int. Cl.
*B65G 53/24* (2006.01)
*B65G 53/06* (2006.01)
(Continued)

(52) U.S. Cl.
CPC ............ *B65G 53/06* (2013.01); *B65G 53/50* (2013.01); *B65G 53/66* (2013.01); *B65G 2203/042* (2013.01)

(58) Field of Classification Search
CPC ......... B65G 53/24; B65G 53/50; B65G 53/66
(Continued)

(56) References Cited

U.S. PATENT DOCUMENTS 3,231,314 A * 1/1966 Cook ................... A01K 61/80
406/74
3,802,782 A * 4/1974 Natelson .............. G01N 21/253
356/409

(Continued)

*Primary Examiner* — Joseph A Dillon, Jr.
(74) *Attorney, Agent, or Firm* — Paul D. Bangor, Jr., Esquire; Clark Hill PLC

(57) ABSTRACT

A material conveying system, comprising: one or more material sources for providing material to be transferred; one or more destination locations for receiving material from the one or more material sources, wherein each destination location has a destination material inlet valve and a destination vacuum valve; one or more material conveying tubes each configured to connect a source to one or more destination locations; a vacuum pump operatively connected to each of the destination vacuum valves via one or more vacuum source tubes, and wherein the vacuum pump is operatively connected to one or more of the material sources through the one or more vacuum source tubes and respective destination vacuum valves, the one or more destination locations and the one or more material conveyor tubes; a first sensor disposed on or near each destination vacuum valve; a second sensor disposed on or near each material inlet valve; a third sensor disposed on or near a vacuum outlet of the vacuum pump; a programmable system controller connected, via wires or wirelessly, to each component of the material conveying system including the one or more material sources, the one or more destination locations, the vacuum pump and to each of the first, second and third sensors; wherein the programmable controller is configured to determine first baseline readings from each of the first, second and/or third sensors while the system is operating but prior to any material being conveyed through the system.

16 Claims, 2 Drawing Sheets

(51) Int. Cl.
B65G 53/50 (2006.01)
B65G 53/66 (2006.01)

(58) Field of Classification Search
USPC ....... 406/11, 2, 12, 14, 19, 35, 36, 123, 153, 406/173, 181; 110/175; 137/625.11, 137/561 A; 366/163.2
See application file for complete search history.

(56) References Cited

U.S. PATENT DOCUMENTS

| | | | | |
|---|---|---|---|---|
| 3,954,303 A * | 5/1976 | Boring | ................ | B01F 15/0235 |
| | | | | 406/53 |
| 4,301,880 A * | 11/1981 | Krambrock | ............ | G01G 13/26 |
| | | | | 177/189 |
| 4,415,297 A * | 11/1983 | Boring | ................ | B65G 53/24 |
| | | | | 406/168 |
| 4,563,112 A * | 1/1986 | Mokuya | ................ | B65G 53/30 |
| | | | | 137/110 |
| 4,793,744 A * | 12/1988 | Montag | ................ | A01C 15/04 |
| | | | | 111/34 |
| 4,834,004 A * | 5/1989 | Butuk | ................ | A01C 15/04 |
| | | | | 111/200 |
| 4,938,848 A * | 7/1990 | Raines | ................ | B65G 53/528 |
| | | | | 204/245 |
| 5,140,516 A * | 8/1992 | Rainville | ................ | B65G 53/66 |
| | | | | 141/104 |
| 5,221,299 A * | 6/1993 | Boring | ................ | B01D 45/12 |
| | | | | 55/459.1 |
| 5,622,457 A * | 4/1997 | Thiele | ................ | B65G 53/56 |
| | | | | 406/1 |
| 6,776,561 B1 * | 8/2004 | Yeh | ................ | B01F 13/1005 |
| | | | | 141/105 |
| 6,782,835 B2 * | 8/2004 | Lee | ................ | A01C 7/042 |
| | | | | 111/174 |
| 7,168,448 B2 * | 1/2007 | Schmidt | ................ | F28B 1/06 |
| | | | | 137/561 A |
| 7,295,932 B2 * | 11/2007 | Neundorfer | ............ | B65G 53/66 |
| | | | | 702/45 |
| 7,779,769 B2 * | 8/2010 | Memory | ................ | A01C 7/081 |
| | | | | 111/174 |
| 8,753,432 B2 * | 6/2014 | Maguire | ................ | B65G 53/24 |
| | | | | 406/171 |
| 9,304,510 B2 * | 4/2016 | Hoopes | ................ | G05B 19/4189 |
| 9,561,915 B2 * | 2/2017 | Kelly | ................ | B65G 53/56 |
| 9,937,651 B2 * | 4/2018 | Zinski | ................ | B65G 53/66 |
| 10,131,506 B2 * | 11/2018 | Maguire | ................ | B65G 53/26 |
| 10,138,076 B2 * | 11/2018 | Maguire | ................ | B65G 53/24 |
| 10,144,598 B2 * | 12/2018 | Zinski | ................ | B65G 53/66 |
| 10,175,701 B2 * | 1/2019 | Maguire | ................ | G05D 7/0153 |
| 10,179,696 B2 * | 1/2019 | Maguire | ................ | B65D 90/587 |
| 10,179,708 B2 * | 1/2019 | Maguire | ................ | B65G 53/66 |
| 10,280,015 B2 * | 5/2019 | Maguire | ................ | B65G 53/24 |
| 10,414,083 B2 * | 9/2019 | Zinski | ................ | B65G 53/66 |
| 2002/0085886 A1 * | 7/2002 | Dibble | ................ | B65G 53/66 |
| | | | | 406/197 |
| 2002/0114672 A1 * | 8/2002 | Isozaki | ................ | B65G 53/66 |
| | | | | 406/11 |
| 2007/0022928 A1 * | 2/2007 | Kowalchuk | ............ | A01C 7/082 |
| | | | | 111/175 |
| 2008/0022782 A1 * | 1/2008 | Gysling | ................ | G01F 1/666 |
| | | | | 73/861.27 |
| 2009/0304461 A1 * | 12/2009 | Strohschein | ........ | B65G 53/521 |
| | | | | 406/11 |
| 2012/0266966 A1 * | 10/2012 | Kretschmer | ............ | F23K 3/02 |
| | | | | 137/1 |
| 2013/0211572 A1 * | 8/2013 | Hoopes | ............ | G05B 19/4189 |
| | | | | 700/112 |
| 2013/0299018 A1 * | 11/2013 | Elliott | ................ | F16L 41/03 |
| | | | | 137/561 A |
| 2014/0130887 A1 * | 5/2014 | Byrne | ................ | F04B 11/0008 |
| | | | | 137/15.01 |
| 2014/0326339 A1 * | 11/2014 | Toner | ................ | B01L 3/502746 |
| | | | | 137/561 A |
| 2014/0348597 A1 * | 11/2014 | Moretto | ................ | B65G 43/08 |
| | | | | 406/31 |
| 2016/0096693 A1 * | 4/2016 | Hanaoka | ................ | B65G 53/66 |
| | | | | 406/19 |
| 2016/0272438 A1 * | 9/2016 | Brewster | ................ | B65G 53/66 |
| 2016/0272439 A1 * | 9/2016 | Kelly | ................ | B65G 53/56 |
| 2019/0263602 A1 * | 8/2019 | Berg | ................ | B65G 53/66 |
| 2019/0322473 A1 * | 10/2019 | Kelly | ................ | B65G 53/50 |

* cited by examiner

SYSTEM AND METHOD USING TELEMETRY TO CHARACTERIZE, MAINTAIN AND ANALYZE PNEUMATIC CONVEYING SYSTEMS

CROSS REFERENCE TO RELATED APPLICATIONS

The present application claims the benefit of provisional patent application U.S. patent application Ser. No. 62/649,400 entitled "USING TELEMETRY TO CHARACTERIZE, MAINTAIN AND ANALYZE PNEUMATIC CONVEYING SYSTEMS" and filed Mar. 28, 2018, the entirety of which is incorporated herein by reference for all purposes.

TECHNICAL FIELD OF THE INVENTION

The present disclosure generally relates to the field of pneumatic material conveying systems and methods.

BACKGROUND OF THE DISCLOSURE

In factories that use pneumatic conveying methods to move material, it is common to have a fantail manifold, sometimes called a selector station, where material sources are connected to material destinations. This selector station is used to select which material is going to be conveyed to what destination. The selector station provides flexibility to permit various destinations to be connected to different sources depending on the material desired at the time. The flexibility of being able to connect various sources to various destinations also allows the undesired effect of connecting the wrong source material to a destination.

Also, in pneumatic conveying systems employing wireless controllers on the various components such as the source material containers, vacuum pumps, material receivers and valves, again allows the undesired effect of connecting the wrong source material to a destination or not knowing which source material is connected to a destination component.

In prior pneumatic conveying systems, the wrong material is prevented from being connected by radio frequency identification tags, mating connectors, machine vision, and manual inspection. Manual inspection is subject to the same human error that caused the initial problem and the other methods have deficiencies as well. Radio frequency identification tagging techniques are relatively expensive and involve calibration or paring of the mating connections. Mating connectors are reliant on discrete wiring that is subject to breakage. Machine vision proofing is relatively expensive and involves a camera system that is not effective in high ambient lighting conditions.

BRIEF SUMMARY OF THE DISCLOSURE

Many other variations are possible with the present disclosure, and those and other teachings, variations, and advantages of the present disclosure will become apparent from the description and figures of the disclosure.

One aspect of a preferred embodiment of the present disclosure comprises a material conveying system, comprising: one or more material sources for providing material to be transferred; one or more destination locations for receiving material from the one or more material sources, wherein each destination location has a destination material inlet valve and a destination vacuum valve; one or more material conveying tubes each configured to connect a source to one or more destination locations; a vacuum pump operatively connected to each of the destination vacuum valves via one or more vacuum source tubes, and wherein the vacuum pump is operatively connected to one or more of the material sources through the one or more vacuum source tubes and respective destination vacuum valves, the one or more destination locations and the one or more material conveyor tubes; a first sensor disposed on or near each destination vacuum valve; a second sensor disposed on or near each material inlet valve; a third sensor disposed on or near a vacuum outlet of the vacuum pump; a programmable system controller connected, via wires or wirelessly, to each component of the material conveying system including the one or more material sources, the one or more destination locations, the vacuum pump and to each of the first, second and third sensors; wherein the programmable controller is configured to determine first baseline readings from each of the first, second and/or third sensors while the system is operating but prior to any material being conveyed through the system.

In another aspect of a preferred material conveying system of the present disclosure, each of the first, second and third sensors is selected from the group consisting of a vacuum sensor, a pressure sensor, a vibration sensor and an acoustic sensor.

In yet another aspect of a preferred material conveying system of the present disclosure, each of the first, second and third sensors comprises a vacuum sensor or a pressure sensor.

In another aspect of a preferred material conveying system of the present disclosure, the programmable controller is configured to determine whether a material conveying tube associated with a selected material source has a change in pressure sensed by a vacuum sensor compared to a selected destination vacuum valve operatively connected to the vacuum pump.

In yet another aspect of a preferred material conveying system of the present disclosure, the programmable controller is configured to determine second baseline readings from each of the first, second and third sensors during a time when material is being conveyed through the system.

In another aspect of a preferred material conveying system of the present disclosure, the programmable controller analyzes the first and second baseline readings to determine whether any abnormalities exist therein and whether the first and second baseline readings are suitable for comparing to future respective first and second readings taken by the controller.

In yet another aspect of a preferred material conveying system of the present disclosure, the programmable controller is configured to take readings, continuously or periodically or at certain times, from each of the first, second and/or third sensors while the system is operating but while no material is being conveyed through the system and to compare such readings to the first baseline readings to identify when one or more abnormalities start to appear in the system and to determine cause(s) of and/or to correct such abnormalities before system performance is adversely affected.

In another aspect of a preferred material conveying system of the present disclosure, the programmable controller is configured to take readings, continuously or periodically or at certain times, from each of the first, second and/or third sensors while the system is operating with material being conveyed through the system and to compare such readings to the second baseline readings to identify when one or more abnormalities start to appear in the system and to determine cause(s) of and/or to correct such abnormalities before system performance is adversely affected.

BRIEF DESCRIPTION OF THE SEVERAL VIEWS OF THE DRAWINGS

For the present disclosure to be easily understood and readily practiced, the present disclosure will now be described for purposes of illustration and not limitation in connection with the following figures, wherein.

DETAILED DESCRIPTION OF PREFERRED EMBODIMENT(S) OF THE DISCLOSURE

In the following detailed description, reference is made to the accompanying examples and figures that form a part hereof, and in which is shown, by way of illustration, specific embodiments in which the inventive subject matter may be practiced. These embodiments are described in sufficient detail to enable those skilled in the art to practice them, and it is to be understood that other embodiments may be utilized and that structural or logical changes may be made without departing from the scope of the inventive subject matter. Such embodiments of the inventive subject matter may be referred to, individually and/or collectively, herein by the term "disclosure" merely for convenience and without intending to voluntarily limit the scope of this application to any single inventive concept if more than one is in fact disclosed.

The following description is, therefore, not to be taken in a limited sense, and the scope of the inventive subject matter is defined by the appended claims and their equivalents.

Figure 1:
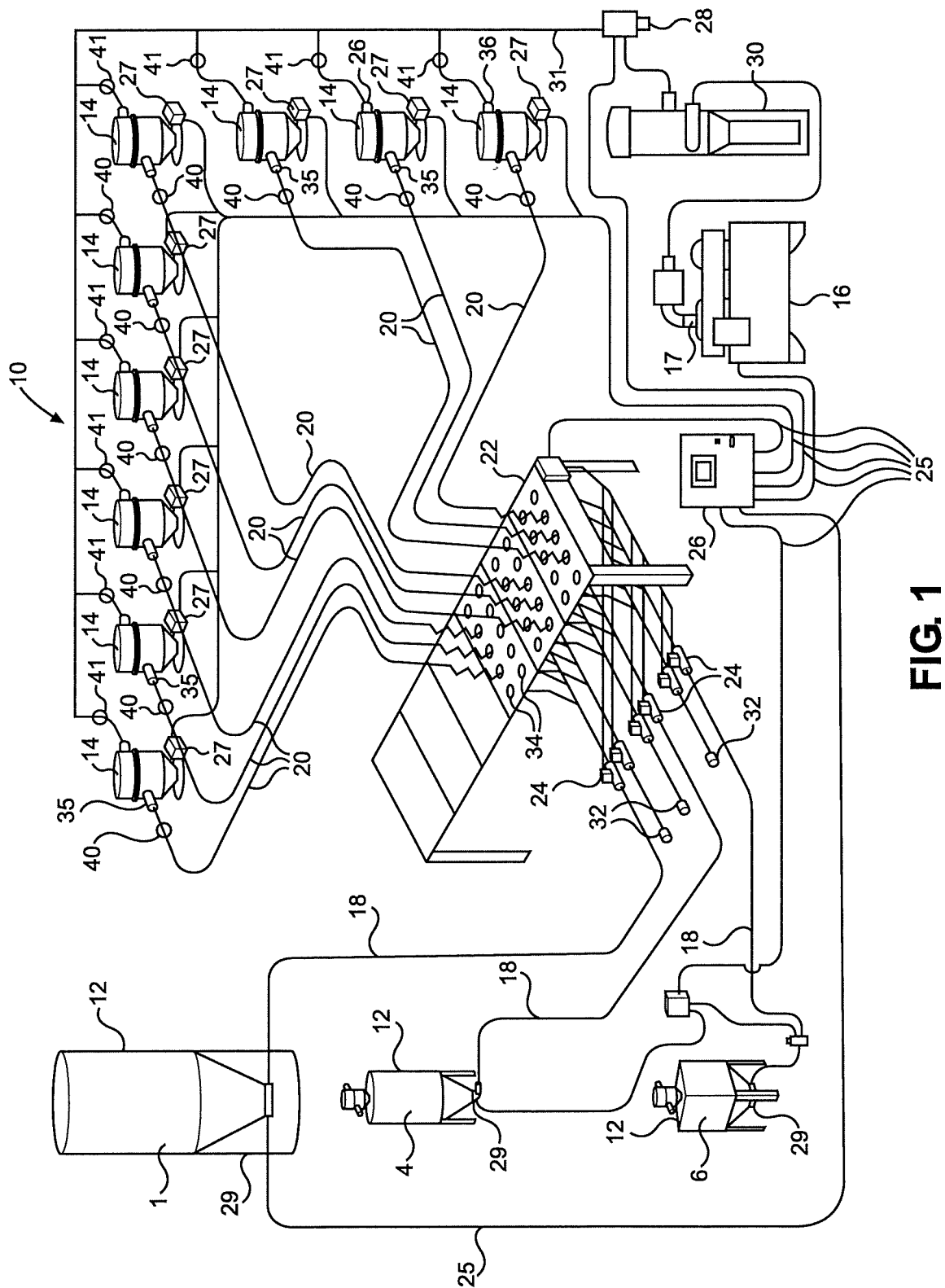
FIG. 1 is a schematic showing various components of a preferred embodiment of a pneumatic conveying system of the present disclosure.
Figure 2:
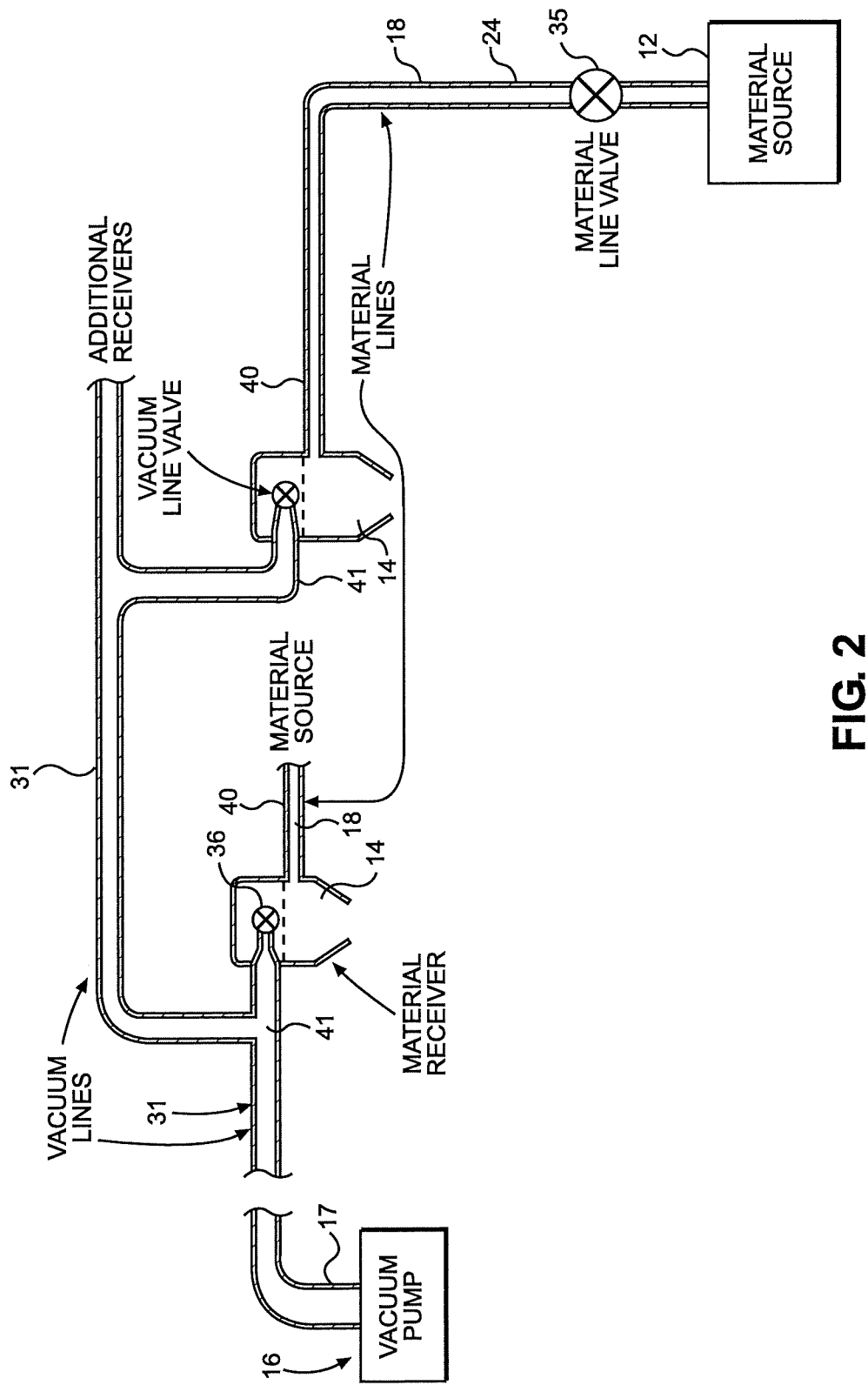
FIG. 2 is a schematic showing various components of another preferred embodiment of a pneumatic conveying system of the present disclosure.

Referring to FIG. 1, one embodiment of the present disclosure system comprises a pneumatic conveying system 10. In system 10, bulk material is transferred from source locations 12 to destination locations 14 through the use of a vacuum source or pump 16. The bulk material may be in the form of powders, granules, and dry bulk material such as ash, beans, cement, corn cobs, corn, corn flakes, plastics, sand, and wheat. The source locations 12 may be one or more drums, bins, silos, or other vessels that hold or delivers source material. The destination locations 14 may be one or more hoppers or loaders intended to receive source material. The material travels from a selected source location 12 to a selected destination location 14 through conveying tubes 18, 20. Source conveying tubes 18 connect source locations 12 to a distribution mechanism or fantail manifold 22. Destination conveying tubes 20 connect fantail manifold 22 to destination locations 14. Fantail manifold 22 has multiple openings with each of the openings 34 connected to a selected one of the destination locations 14 and with each opening 34 configured to be selectively connected to one of the material sources 12 for selectively directing material from the selected material source 12 to the selected destination location 14.

The system 10 described herein monitors the vacuum or pressure level in all source conveying tubes 18 and through a logic processor 26 (which may use connecting wires 25 or comprise wireless communication capabilities for communicating with system components) determines whether the correct source conveying tube 18 is connected to the correct destination conveying tube 20 by insuring that when the vacuum or pressure is applied through the selected destination location 14, the proper source location 12 also incurs a difference in vacuum or pressure from the ambient. This is accomplished by mounting a sensor 24 in the form of a vacuum sensor or pressure switch on each source conveying tube 18. No additional wiring, components, or modifications are necessary to the destination side of the fantail manifold 22. When the logic processor 26 provides vacuum to a destination valve 36 operatively connected to destination location 14, the vacuum pump 16 is connected to a source 12 through the fantail manifold 22. When the destination location 14 is a loader, the destination valve 36 is preferably located in the loader lid. The vacuum is sensed by the vacuum sensors 24 mounted on the source conveying tubes 18. The vacuum sensors 24 are connected to the logic processor 26 that compares which destination location 14 has the vacuum or pressure applied and which source 12 incurs similar vacuum or pressure. If the correct source 12 has the vacuum or pressure change relative to ambient, the system 10 is permitted to continue to operate. If an incorrect source 12 incurs the vacuum or pressure differential, the logic processor 26 stops the vacuum pump 16 to prevent the system 10 from conveying material, and notifies operators through sound, light, electronic message, or other alarm or error notification means.

Logic processor 26 is typically the control portion of a complete central loading system including several vacuum pumps 16 with their associated destination locations or material receivers 14 and many source locations 12. The logic processor 26 coordinates the sharing of source locations 12 with the destination locations 14 in the system. Vacuum pumps 16 are busy when they are servicing other destination locations 14 and source locations 12 are busy when they are being used by other destination locations 14. Destination locations 14 and source locations 12 are enabled in the software of the logic controller 26 which makes them ready to run. Destination locations 14 have demand when their demand sensor is uncovered. Vacuum pumps 16 are not busy when they are idling or not servicing other destination locations 14.

Referring to FIG. 1, system 10 further comprises a relief valve 28 associated with the vacuum pump 16. The relief valve 28 is used to relieve a portion of the vacuum from the source conveying tube 18 until the vacuum sensor 24 determines if the correct connection is made. Only one source conveying tube 18 is connected to the vacuum pump 16 at a time, and that is determined by which destination location 14 has the destination valve 36 open. By partially relieving the vacuum until the connection is proofed, it is possible to prevent the conveyed material from beginning to move and possibly going into the wrong conveying tube 20.

Referring to FIG. 1, system 10 further comprises a dust collector 30. The dust collector 30 separates any dust that is carried through the destination locations 14 from the air before the air goes into the vacuum pump 16. Dust entering the vacuum pump 16 causes maintenance problems and shortens the life of the vacuum pump 16. The spare lines 32 in FIG. 1 represent future expansion. The spare lines 32 could be connected to additional source locations 12 added to the factory in the future. The three source locations 12 are examples of the storage vessels that could be used: source location 12 designated by #1 is a silo typically located outside a building, source location 12 designated by #4 is a drying hopper having a dryer (not shown) connected to it, source location 12 designated by #6 is a surge bin, or an intermediate storage area inside the building, that could be filled from a silo or from boxes of material. Other storage vessels can also be used.

Embodiments of the present disclosure prevent the wrong material from being conveyed to the wrong destination by the addition of vacuum sensors 24 to the source conveying tubes 18 used for conveying material. No additional components are required on the destination side of the fantail manifold 22. The system is less expensive and can be easily retrofit to existing fantail manifolds.

Other preferred embodiments of conveying system 10 of the present disclosure may differ with variations in the number of receivers 14, size of vacuum pumps 16, size (or diameter) and length of vacuum lines 31, size (or diameter) and length of material lines 18, 20, size of dust collector 30, material(s) being conveyed, vertical and horizontal distances of material and line sizes, and number of bends in material lines 18, 20 and vacuum lines 31. During operation of conveying system 10 many problems can occur that negatively affect the performance of conveying system 10. Examples are leaks in the vacuum lines 31, leaks in the material lines 18, 20, leaks in valves 36 in the receiver and material lines 18, 20, filter cleanliness, pump seals, leaks in dust collector seals, and obstructions in material lines 18, 20 and vacuum lines 31. Because of the variety of potential problems, the expansiveness of the pneumatic conveying system 10, and the difficulty accessing the system components which are normally installed above all other equipment in the factory, troubleshooting may be very tedious.

Preferably, as shown in FIG. 1, the pneumatic conveying system 10 of the present disclosure uses sensors 17, 24, 29, 40 and 41 of the wired or wireless variety in proximity to the vacuum inlet or valve 36 of material receivers 14, the material inlet 35 of the material receivers, and vacuum outlet of vacuum pump 16, and/or at the material source 12 which can be used to characterize a properly performing pneumatic conveying system 10 and diagnose problems with an improperly performing pneumatic conveying system 10. Preferably, sensors 17, 24, 29, 40 and 41 may comprise a vacuum sensor, a pressure sensor, a vibration sensor or an acoustic sensor.

When a new pneumatic conveying system 10 is started and before material is conveyed, vacuum pump 16 can be turned on and measurements made at vacuum line sensors 41 should be similar to each other. A difference in sensor readings is an indicator that a vacuum leak is present. This vacuum leak could be measured as a difference in vacuum level among the sensors 41. Vacuum readings closer to ambient pressure indicate a leak close by a sensor 41, while vacuum readings closer to that measured at the vacuum pump 16 indicate a properly sealed system 10. If a new pneumatic conveying system 10 has no leaks, all vacuum sensors 41 located on the vacuum lines 31 will have readings similar to sensors 17 on the vacuum pumps 16. If any vacuum sensor 40 differs significantly from the vacuum pump sensors 17, the system 10 is preferably analyzed for leaks which should be corrected before continuing.

Once the vacuum line side is confirmed to be operating correctly, the material lines 18 and 20 can be tested. Each material line 18, 20 can be blocked at the source 12 and once again the pumps 16 are turned on. When the vacuum line valve 36 in the material receiver 14 corresponding to that material line 18, 20 is opened, the vacuum sensor(s) 24, 40 on that material line 18, 20 should read values similar to that of sensor 41 on the vacuum line 31 and sensor 17 on the respective vacuum pump 16. If any vacuum sensor(s) 24, 40 on the material lines 18, 20 differ significantly from the vacuum line sensors 41, the system 10 will be analyzed for leaks to be corrected before continuing.

Once all material lines 18, 20 have been tested and verified to have vacuum readings similar to the vacuum lines 31 and vacuum pump 17, the system 10 is ready to record baseline readings that can be used for future troubleshooting. A first set of readings is preferably taken with all vacuum line valves 36 closed. Then a set of readings is preferably recorded when each vacuum line valve 36 is open, both with the material lines 18, 20 open and with the material lines 18, 20 closed. These readings are preferably stored for comparison in the future for preventive maintenance and troubleshooting of pneumatic conveying system 10.

Similarly, vibration and acoustic measurements can be made to observe anomalies and identify which branch of vacuum and/or material lines and the approximate position(s) of problems.

In a preferred aspect, the present disclosure uses sensors located in pneumatic conveying lines to determine normal operating characteristics and aid in troubleshooting. Each pneumatic conveying system is unique and therefore has its own distinctive operating parameters. By locating vacuum, acoustic, and/or vibration sensors in the pneumatic conveying lines these distinctive operating parameters can be monitored and recorded such that: 1. A baseline can be established for a pneumatic conveying system before material is introduced into the system; 2. A baseline can be established for a pneumatic conveying system while material is being conveyed; 3. The baselines can be analyzed to determine if there are abnormalities and determine if these baselines are suitable for comparing future measurements; 4. The characteristics can be monitored without conveying material and compared to the baseline to determine abnormalities before the conveying system performance is adversely affected; 5. The characteristics can be monitored while conveying material and compared to the baseline to determine abnormalities before the conveying system performance is adversely effected; 6. The characteristics can be monitored without conveying material and compared to the baseline to determine causes of problems after they adversely affect conveying performance; 7. The characteristics can be monitored while conveying material and compared to the baseline to determine causes of problems after they adversely affect conveying performance; 8. The characteristics can be monitored without conveying material and analyzed to determine causes of abnormalities before or after the conveying system performance is adversely effected; and/or 9. The characteristics can be monitored while conveying material and analyzed to determine causes of abnormalities before or after the conveying system performance is adversely affected.

Preferably, the system of the present disclosure minimizes downtime by observing and identifying problems before they adversely affect pneumatic material conveying systems and also aids in quickly identifying problems or abnormalities after they have appeared in pneumatic conveying systems.

In the foregoing Detailed Description, various features are grouped together in a single embodiment to streamline the disclosure. This method of disclosure is not to be interpreted as reflecting an intention that the claimed embodiments of the disclosure require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A material conveying system, comprising:
   one or more material sources for providing material to be transferred;
   one or more destination locations for receiving material from the one or more material sources, wherein each destination location has a destination material inlet valve and a destination vacuum valve;
   one or more material conveying tubes each configured to connect a source to one or more destination locations;
   a vacuum pump operatively connected to each of the destination vacuum valves via one or more vacuum source tubes, and wherein the vacuum pump is operatively connected to one or more of the material sources through the one or more vacuum source tubes and respective destination vacuum valves, the one or more destination locations and the one or more material conveyor tubes;
   a first sensor disposed on or near each destination vacuum valve;
   a second sensor disposed on or near each material inlet valve;
   a third sensor disposed on or near a vacuum outlet of the vacuum pump;
   a programmable system controller connected, via wires or wirelessly, to each component of the material conveying system including the one or more material sources, the one or more destination locations, the vacuum pump and to each of the first, second and third sensors;
   wherein the programmable controller is configured to determine first baseline readings from each of the first, second and/or third sensors while the system is operating but prior to any material being conveyed through the system.

2. The material conveying system of claim 1 wherein each of the first, second and third sensors is selected from the group consisting of a vacuum sensor, a pressure sensor, a vibration sensor and an acoustic sensor.

3. The material conveying system of claim 1 wherein each of the first, second and third sensors comprises a vacuum sensor or a pressure sensor.

4. The material conveying system of claim 3 wherein the programmable controller is configured to determine whether a material conveying tube associated with a selected material source has a change in pressure sensed by a pressure sensor compared to a selected destination vacuum valve operatively connected to the vacuum pump.

5. The material conveying system of claim 1 wherein the programmable controller is configured to determine second baseline readings from each of the first, second and third sensors during a time when material is being conveyed through the system.

6. The material conveying system of claim 2 wherein the programmable controller is configured to determine second baseline readings from each of the first, second and third sensors during a time when material is being conveyed through the system.

7. The material conveying system of claim 3 wherein the programmable controller is configured to determine second baseline readings from each of the first, second and third sensors during a time when material is being conveyed through the system.

8. The material conveying system of claim 1 wherein the programmable controller analyzes the first and second baseline readings to determine whether any differences exist therein and whether the first and second baseline readings can be used for comparing to future respective first and second readings taken by the controller.

9. The material conveying system of claim 2 wherein the programmable controller analyzes the first and second baseline readings to determine whether any differences exist therein and whether the first and second baseline readings can be used for comparing to future respective first and second readings taken by the controller.

10. The material conveying system of claim 3 wherein the programmable controller analyzes the first and second baseline readings to determine whether any differences exist therein and whether the first and second baseline readings can be used for comparing to future respective first and second readings taken by the controller.

11. The material conveying system of claim 5 wherein the programmable controller analyzes the first and second baseline readings to determine whether any differences exist therein and whether the first and second baseline readings can be used for comparing to future respective first and second readings taken by the controller.

12. The material conveying system of claim 1 wherein the programmable controller is configured to take readings, continuously or periodically or at certain times, from each of the first, second and/or third sensors while the system is operating but while no material is being conveyed through the system and to compare such readings to the first baseline readings to identify when one or more differences with the first baseline readings start to appear.

13. The material conveying system of claim 5 wherein the programmable controller is configured to take readings, continuously or periodically or at certain times, from each of the first, second and/or third sensors while the system is operating with material being conveyed through the system and to compare such readings to the second baseline readings to identify when one or more differences start to appear.

14. The material conveying system of claim 1 wherein the programmable controller is configured to take readings, continuously or periodically or at certain times after one or more differences with one or more of the first baseline readings have appeared, from each of the first, second and/or third sensors while the system is operating but while no material is being conveyed through the system and to compare such readings to the first baseline readings to determine cause(s) of and/or to correct one or more causes of such differences before or after system performance has been adversely affected.

15. The material conveying system of claim 8 wherein the programmable controller is configured to take readings, continuously or periodically or at certain times after one or more differences have appeared in the system, from each of the first, second and/or third sensors while the system is operating but while no material is being conveyed through the system and to compare such readings to the first baseline readings to determine cause(s) of and/or to correct one or more causes of such differences before or after system performance has been adversely affected.

16. The material conveying system of claim 5 wherein the programmable controller is configured to take readings, continuously or periodically or at certain times after one or more differences have appeared in the system, from each of the first, second and/or third sensors while the system is operating with material being conveyed through the system and to compare such readings to the second baseline readings to determine cause(s) of and/or to correct one or more causes of such differences before or after system performance has been adversely affected.

\* \* \* \* \*